US008351861B2

(12) United States Patent
Min et al.

(10) Patent No.: US 8,351,861 B2
(45) Date of Patent: Jan. 8, 2013

(54) OPPORTUNISTIC SPECTRUM ACCESS IN MOBILE COGNITIVE RADIO NETWORKS

(75) Inventors: Alexander Min, Ann Arbor, MI (US); Kyu-Han Kim, Redwood City, CA (US); Jatinder Pal Singh, Mountain View, CA (US)

(73) Assignee: Deutsche Telekom AG, Bonn (DE)

( * ) Notice: Subject to any disclaimer, the term of this patent is extended or adjusted under 35 U.S.C. 154(b) by 174 days.

(21) Appl. No.: 12/894,663

(22) Filed: Sep. 30, 2010

(65) Prior Publication Data

US 2012/0083303 A1 Apr. 5, 2012

(51) Int. Cl.
*H04B 15/00* (2006.01)
*H04B 17/00* (2006.01)

(52) U.S. Cl. .......... 455/62; 455/67.11; 370/329

(58) Field of Classification Search .......... 455/62, 455/67.11; 370/329
See application file for complete search history.

(56) References Cited

U.S. PATENT DOCUMENTS

| | | | |
|---|---|---|---|
| 2008/0240024 A1* | 10/2008 | Rao et al. ............ | 370/329 |
| 2009/0034508 A1 | 2/2009 | Gurney et al. | |
| 2009/0310548 A1* | 12/2009 | Kwon et al. .......... | 370/329 |
| 2010/0091789 A1* | 4/2010 | Choi et al. ............ | 370/445 |
| 2010/0173587 A1 | 7/2010 | Gan et al. | |
| 2010/0330919 A1* | 12/2010 | Gurney et al. ........ | 455/67.11 |

FOREIGN PATENT DOCUMENTS

| | | |
|---|---|---|
| EP | 2205016 A1 | 7/2010 |
| WO | 2009018300 A1 | 2/2009 |
| WO | 2009031825 A1 | 3/2009 |

OTHER PUBLICATIONS

Yunxia Chen; Qing Zhao; Swami, A., "Joint Design and Separation Principle for Opportunistic Spectrum Access", 2006, Signals, Systems and Computers, 2006. ACSSC '06. Fortieth Asilomar Conference, p. 696-700.*

Y.-C. Liang, Y. Zeng, E. C. Peh, and A. T. Hoang, "Sensing-Throughput Tradeoff for Cognitive Radio Networks," *IEEE Transactions on Wireless Communications*, vol. 7, No. 4, pp. 1326-1337, Apr. 2008.

A. W. Min and K. G. Shin, "An Optimal Sensing Framework Based on Spatial RSS-profile in Cognitive Radio Networks," in *Proc. IEEE SECON*, Jun. 2009.

(Continued)

*Primary Examiner* — Temesgh Ghebretinsae
*Assistant Examiner* — Gennadiy Tsvey
(74) *Attorney, Agent, or Firm* — Leydig, Voit & Mayer, Ltd.

(57) ABSTRACT

A method of spectrum access for wireless communications by a secondary unlicensed unit in a CRN environment comprising one or more secondary unlicensed mobile units and one or more primary licensed units includes receiving information indicative of a location and movement of one or more secondary unlicensed units and a channel usage pattern and spatial distribution of one or more primary licensed units is accessed and a guard distance to shield the one or more primary licensed units from interference is calculated. The channel availability to the one or more secondary unlicensed units is then calculated according to a two-state Markov model including the guard distance as a constraint and based on the information indicative of the location and movement of the one or more secondary unlicensed units and the channel usage pattern and spatial distribution of the one or more primary licensed units.

20 Claims, 15 Drawing Sheets

OTHER PUBLICATIONS

A. W. Min and K. G. Shin, "On Sensing-Access Tradeoff in Cognitive Radio Networks," in *Proc. IEEE DySPAN*, Apr. 2010.

A. W. Min and K. G. Shin, "Impact of Mobility on Spectrum Sensing in Cognitive Radio Networks," in *Proc. ACM CoRoNet*, Sep. 2009.

A. Dejonghe et al., "Versatile spectrum sensing on mobile devices?" in *Proc. IEEE DySPAN*, Apr. 2010.

Q. Zhao, L. Tong, A. Swami, and Y. Chen, "Decentralized Cognitive MAC for Opportunistic Spectrum Access in Ad Hoc Networks: A POMDP Framework," IEEE Journal on Selected Areas in Communications, vol. 25, No. 3, pp. 589-600, Apr. 2007.

M. Wellens, J. Riihijarvi, and P. Mahone, "Evaluation of Adaptive MAC-Layer Sensing in Realistic Spectrum Occupancy Scenarios," in *Proc. IEEE DySPAN*, Apr. 2010.

FCC, "Second Report and Order," FCC 08-260, Nov. 2008.

M. Vu, N. Devroye, and V. Tarokh, "On the Primary Exclusive Region of Cognitive Networks," *IEEE Transactions on Wireless Communications*, vol. 8, No. 7, pp. 3380-3385, Jul. 2009.

M. F. Hanif, M. Shafi, P. J. Smith, and P. Dmochowski, "Interference and Deployment Issues for Cognitive Radio Systems in Shadowing Environments," in *Proc. IEEE ICC*, Jun. 2009.

A. Fehske, J. Gaeddert, and J. H. Reed, "A New Approach to Signal Classification Using Spectral Correlation and Neural Networks," in *Proc. of IEEE DySPAN*, Nov. 2005.

J. Nieminen, R. Jantti, and L. Qian, "Primary User Detection in Distributed Cognitive Radio Networks under Timing Inaccuracy," in *Proc. IEEE DySPAN*, Apr. 2010.

M. Vu, S. S. Ghassemzadeh, and V. Tarokh, "Interference in a Cognitive Network with Beacon," in *Proc. IEEE WCNC*, Jun. 2008.

Y. Yang, Y. Liu, Q. Zhang, and L. Ni, "Cooperative Boundary Detection for Spectrum Sensing Using Dedicated Wireless Sensor Networks," in *Proc. IEEE INFOCOM*, Apr. 2010.

B. Liu, P. Brass, O. Dousse, P. Nain, and D. Towsley, "Mobility Improves Coverage of Sensor Networks," in *Proc. ACM MobiHoc*, May 2005.

W. Wang and M. Zhao, "Joint Effects of Radio Channels and Node Mobility on Link Dynamics in Wireless Networks," in *Proc. of IEEE INFOCOM*, Apr. 2008.

H. Boche et al., "The Kullback—Leibler Divergence and Nonnegative Matrices," IEEE Transactions on Information Theory, vol. 52, No. 12, p. 5539-5545, Dec. 2006.

Qing Zhao et al., "Decentralized cognitive mac for dynamic spectrum access", 2005 1$^{st}$ IEEE International Symposium on New Frontiers in Dynamic Spectrum Access Networks, Baltimore, MD, USA, Nov. 8, 2005, pp. 224-232.

* cited by examiner

US 8,351,861 B2

OPPORTUNISTIC SPECTRUM ACCESS IN MOBILE COGNITIVE RADIO NETWORKS

FIELD

The present invention relates generally to spectrum access in cognitive radio networks, and more particularly relates to opportunistic spectrum access in such networks.

BACKGROUND

The inventors have observed that channel availability is an interesting parameter with respect to providing spectrum access in networks such as cognitive radio networks (CRNs). However, estimating availability based solely on a primary unit's (PU's) temporal channel usage statistics is not an adequate approach, in that it fails to accommodate the effects of secondary units (SUs). While spectrum sensing and access strategies based on the assumption of exponentially-distributed PU traffic could be efficient in general, models hinging on the assumption of static CRNs, where both PUs and SUs are stationary, may not be effective with respect to mobile CRNs where SUs observe different channel availability based on their locations.

This background section is presented for the convenience of the reader, and is not intended to survey the prior art. In particular, this section represents the knowledge of the inventors and is not to be taken as an indication that any technology or system discussed above is actually in existence or is known to anyone other than the inventors. Thus, the inventors specifically disclaim the foregoing as a discussion of prior art, and refer any reader interested in prior art to the actual printed art of record.

SUMMARY

In various embodiments, the invention provides a method of spectrum access for wireless communications by a secondary unlicensed unit in a CRN environment comprising one or more secondary unlicensed units and one or more primary licensed units, wherein the one or more secondary units are mobile units. The method comprises receiving information indicative of a location and movement of one or more secondary unlicensed units and a channel usage pattern and spatial distribution of one or more primary licensed units. A guard distance is provided to shield the one or more primary licensed units from interference induced by the one or more secondary unlicensed units. The guard distance specifies a radius of the one or more primary licensed units within which the one or more secondary unlicensed units will not have spectrum access. Channel availability to the one or more secondary unlicensed units is calculated according to a two-state Markov model including the guard distance as a constraint and based on the information indicative of the location and movement of the one or more secondary unlicensed units and the channel usage pattern and spatial distribution of the one or more primary licensed units. Access to the spectrum is granted to the one or more secondary unlicensed units based on the calculated channel availability.

BRIEF DESCRIPTION OF THE DRAWINGS

Further features and advantages of the invention will be apparent from the detailed description below, taken in conjunction with the figures, of which.

DETAILED DESCRIPTION

Figure 1:
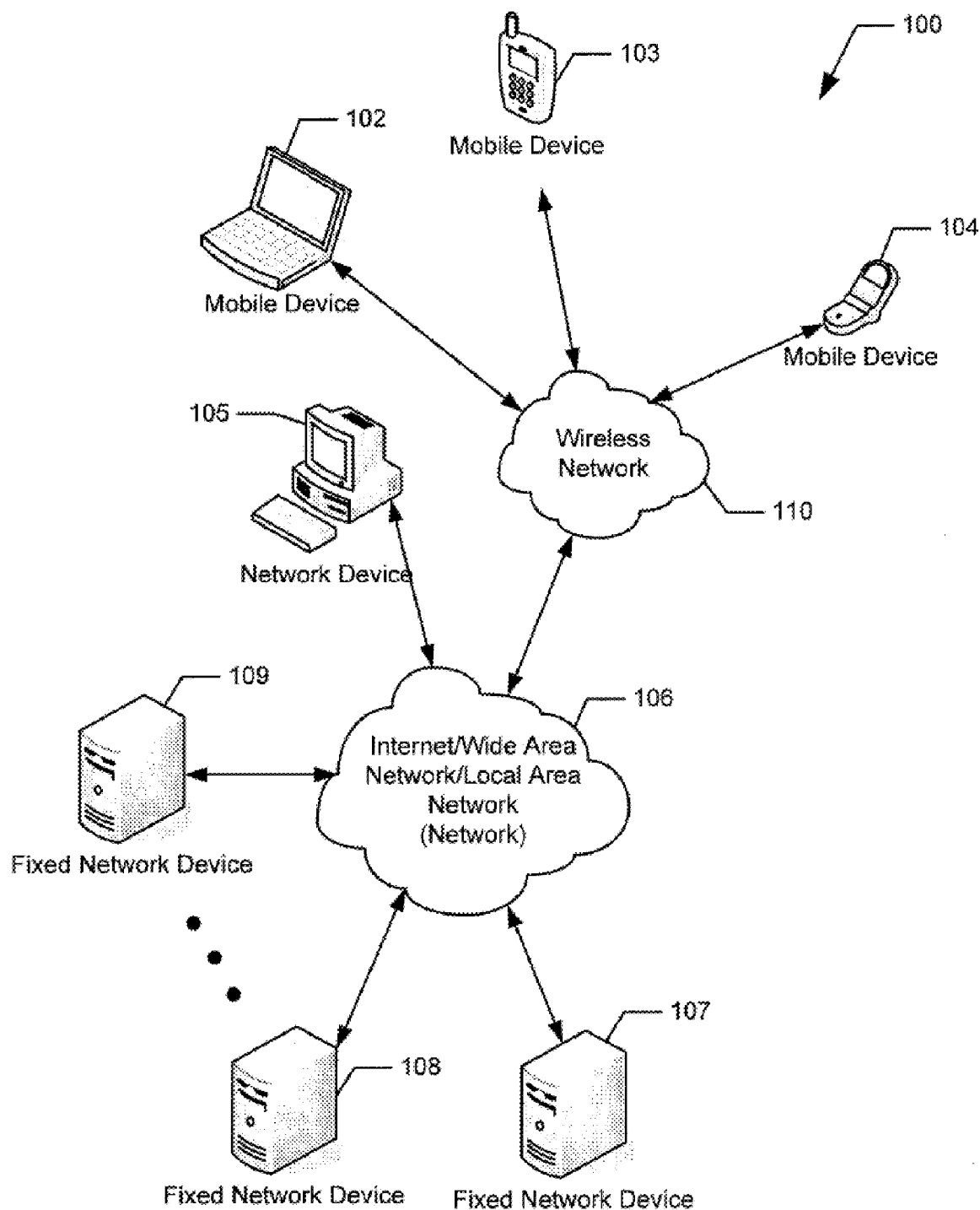
FIG. 1 depicts a network system according to one embodiment of the invention.

The introduction of cognitive radio (CR) technology improves spectrum efficiency by enabling efficient coexistence between primary (licensed) and secondary (unlicensed) devices. While this tends to mitigate spectrum shortage problems, secondary users (SUs) must still be able to provision sufficient spectrum opportunities to deliver a high quality of service to secondary users/devices, while protecting primary communications. To this end, efficient detection and fair sharing of spectrum opportunities are of interest.

However, enabling opportunistic spectrum access in CRNs (CR Networks) can be challenging to execute due to the need to accurately estimate and predict spectrum availability, protect primary communications, and efficiently and fairly share any spectrum opportunities. While it is possible to address the noted challenges in static CRNs where both PUs and SUs are stationary, it is challenging to achieve these objectives when mobile SUs are present. For example, frequent location change of mobile SUs will affect the availability of spectrum bands and will increase the potential of excessive interference to primary communications.

Various embodiments of the invention address the characterization of spectrum availability, the protection of primary communications, and the use of an efficient distributed spectrum access strategy. A channel availability model considers the mobility of SUs and the channel usage patterns of PUs and their spatial distributions. With respect to mobile CRNs, the availability of licensed channels not only depends on the PUs' traffic statistics, but also the SUs' location relative to the active primary transmitters. In an embodiment of the invention, the channel availability for mobile SUs is accurately modeled as a two-state Markov model, which captures the effects of various system parameters, such as the speed of SUs, the PU density, and any interference constraints.

Protection mechanisms are employed to shield the PUs from interference induced by mobile SUs, e.g., to maximize the spectrum efficiency while protecting primary communications. In an embodiment, both the time domain and space domain are employed to allow joint optimization of the spectrum sensing interval and the primary protection region. There is a tradeoff in selecting a "guard distance" for primary protection, in that too small a guard distance will result in large sensing time overhead. An optimal (i.e., minimal effective) guard distance is provided in closed-form expression that maximizes the overall spectrum opportunity in the spatio-temporal domain.

In a further embodiment of the invention, a distributed channel access strategy maximizes the secondary network throughput. In mobile CRNs, each licensed channel may provide or require a different amount of spectrum opportunities and overheads, depending not only on the PUs' channel usage patterns, but also on the SUs' mobility. In an embodiment of the invention, the problem of optimal channel selection is solved as an optimization problem, and more particularly, a convex optimization. Thus, embodiments of the invention provide a closed-form expression for optimal channel selection strategy, including the impacts of various network parameters, such as SU density, on the channel access strategy.

In short, the spectrum availability model for mobile CRN, the mobility-aware spectrum sensing scheduling algorithm, the use of a guard distance maximizing spatio-temporal spectrum opportunities, and the derivation of an optimal channel selection strategy combine to provide improved opportunistic spectrum access in mobile CRNs.

Given this overview, various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Prior to discussing the details of the spectrum usage and modeling, an overview of basic devices and network structures is given to aid the reader. FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 include network 106, wireless network 110, mobile devices 102-104, fixed network devices 105 and 107-109.

In general, system 100 has a Peer-to-Peer (P2P) distributed network structure including network nodes (devices) that make a portion of their resources, such as processing power, network bandwidth, or data stored thereon, directly available to other network nodes, without the need for central coordination instances, such as servers or stable hosts. A network node, such as mobile devices 102-104 or fixed network devices 105 or 107-109, can directly request and receive data from a plurality of other participants and assemble them to recover the information. For example, mobile device 102 can request video data be sent from fixed network devices 107-109 in parallel and assemble them to form a single video stream, which is then played back on the screen of the mobile device 102. Because the system 100 is organized in a P2P structure, there is no server-client relationship among the devices 102-105 and 107-109. Each device can potentially contribute to data available within the system 100.

Generally, mobile devices 102-104 may include virtually any mobile computing device capable of receiving data over a network, such as wireless network 110, or the like. Such devices include portable devices such as, cellular telephones, smart phones, radio frequency (RF) devices, infrared devices, Personal Digital Assistants (PDAs), handheld computers, laptop computers, wearable computers, tablet computers, integrated devices combining one or more of the preceding devices, or the like.

Network device 105 may include virtually any computing device that typically connects using a wired communications medium such as personal computers, multiprocessor systems, microprocessor-based or programmable consumer electronics, network PCs, or the like.

Devices that may operate as network devices 107-109 include personal computers desktop computers, multiprocessor systems, microprocessor-based or programmable consumer electronics, network PCs, servers, and the like.

In general, the fixed network devices 107-109 have higher processing power and larger disk storage and bandwidth, and, therefore, are configured to receive as well as supply resources or data to other participants in system 100. Some of the fixed network devices, on the other hand, such as device 105, have very limited processing power or storage space. Therefore, devices such as 105 are configured as consumers of data, meaning that they only receive data provided by other participants, but do not provide data to other network nodes. Similarly, most mobile devices 102-104 are generally configured as data consumer, which only receive but do not supply data, because of their limited processing power, bandwidth, and storage space.

Server device 107 may further provide a variety of services that include, but are not limited to web services, third-party services, audio services, video services, email services, IM services, SMS services, VOIP services, calendaring services, photo services, or the like. Content may include web content, audio content, video content, FTP data, or the like.

Wireless network 110 is configured to couple mobile devices 102-104 with network 106. Wireless network 110 may include any of a variety of wireless sub-networks that may further overlay stand-alone ad-hoc networks, or the like, to provide a connection for mobile devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between mobile devices 102-104 and another computing device, network, or the like.

Network 106 is configured to couple network devices 105 and 107-109 with other computing devices, including through wireless network 110 to mobile devices 102-104. Network 106 is enabled to employ any form of computer readable media for communicating information from one electronic device to another. Also, network 106 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. in addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link, In essence, network includes any communication method by which information may travel between computing devices. Illustrative Mobile Devices 102-104 and Network Device 105

Figure 2:
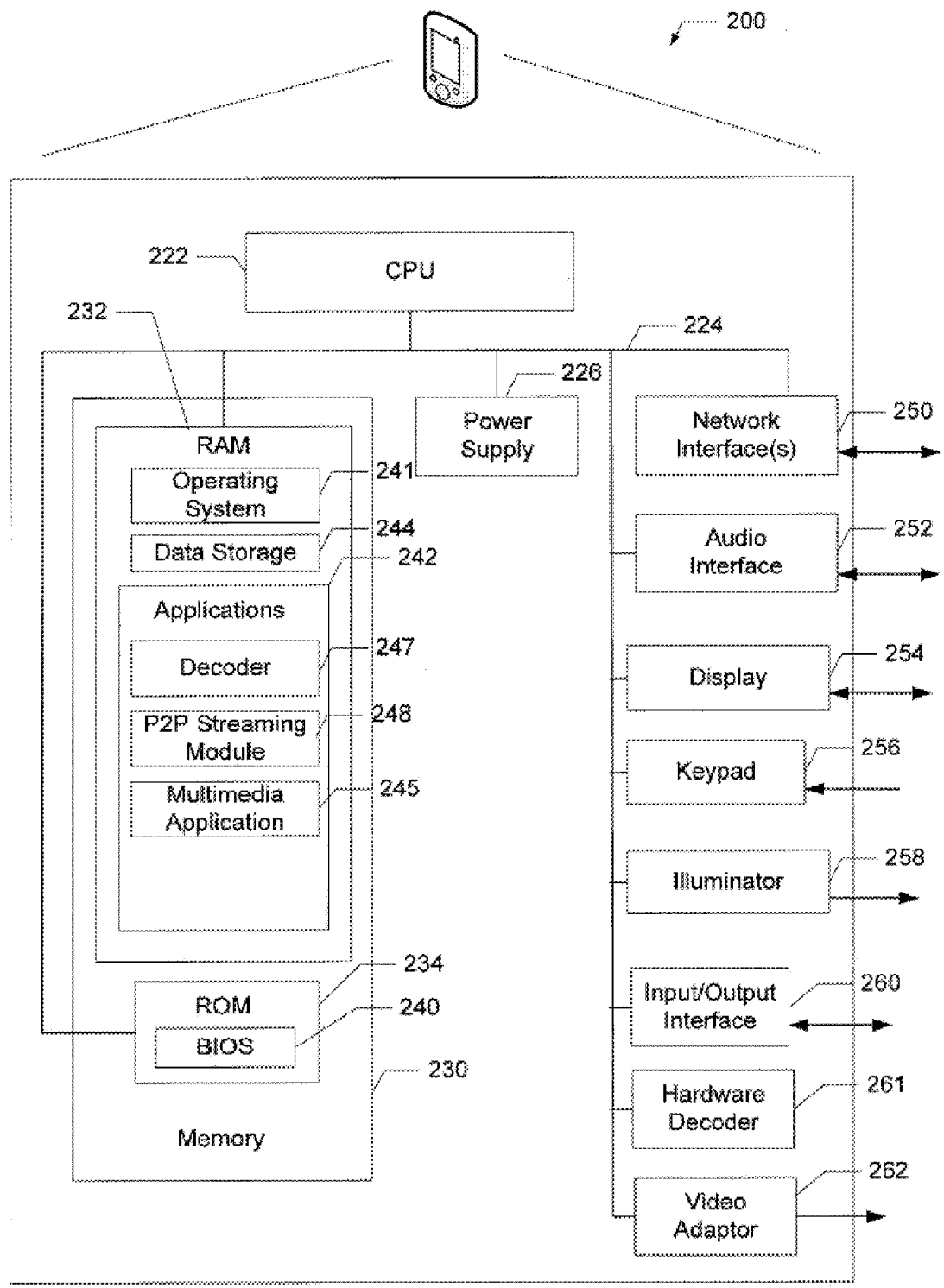
FIG. 2 depicts a schematic diagram of the mobile device shown in FIG. 1.

FIG. 2 shows one embodiment of device 200 that may be included in system 100 implementing the invention. Device 200 may include many more or less components than those shown in FIG. 2. However, the components shown are sufficient to implement an illustrative embodiment for practicing the present invention. Device 200 may represent, for example, one embodiment of at least one of mobile devices 102-104 and network device 105 of FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, and an input/output interface 260, Power supply 226 provides power to device 200. A rechargeable or non-rechargeable battery may be used to provide power. The power may also be provided by an external power source, such as an AC adapter or a powered docking cradle that supplements andlor recharges a battery. Device 200 further includes a Random Access Memory (RAM) 232, Read-Only Memory (ROM) 234, a Basic Input Output System (BIOS) 240, Operating System 241, Applications 242, and Data Storage 244.

Device 200 can communicate with another computing device directly or indirectly via network interface 250. Network interface 250 includes circuitry for coupling device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand. In addition, device 200 may further include video adaptor 262, which is configured to provide video signals to an external display.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the device is powered. In addition, illuminator 258 may backlight these buttons in various patterns when particular actions are performed, such as dialing another device. Illuminator 258 may also cause light sources positioned within a transparent or translucent case of the device to illuminate in response to actions.

Device 200 also comprises input/output interface 260 for communicating with external devices, such as a headset. Input/output interface 260 can utilize one or more communication technologies, such as USB, infrared, Bluetooth™, or the like.

Device 200 typically ranges widely in terms of capabilities and features. For example, a cell phone 104 may have a numeric keypad and a few lines of monochrome LCD display on which only text may be displayed. In another example, a web-enabled mobile device such as a PDA 103 may have a touch sensitive screen, a stylus, and several lines of color LCD display in which both text and graphics may be displayed. In still another example, a multimedia-enabled mobile device such as laptop 102 may include a multimedia application 245 such as a video player application, which is configured to render images, videos streams, audio signals, or the like through a multimedia interface such as a color LCD or LED screen or a microphone. In still another example, device 200 may also include a browser application configured to receive and display graphics, text, multimedia, or the like, employing virtually any web-based language, including a wireless application protocol messages (WAP), or the like. For example, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), or the like, to display and send information.

As depicted in FIG. 2, in general, device 200 also includes a decoder. In one embodiment, the decoder is part of the multimedia application 245 described above or a standalone application 247 running in parallel with the multimedia application on the device. In another embodiment, the decoder is provided in a hardware module 261 as part of the hardware circuit in the device. The decoder is configured to decode multimedia data from the data stream received by the device and feed the decoded data to the multimedia application 245 such as the video player. Depending on the coding technique used in the encoded data stream, the decoder can perform loss or lossless decoding. The decoder may utilize proprietary decoding techniques or standardized decoding techniques defined in standard specifications such as H.261, H.264, JPEG, or MPEG.

Device 200 further include a P2P streaming module, which is configured to process the coded data stream received from other computing devices through network interface 250 in accordance with a P2P transmission scheme. The P2P streaming module can be part of the decoder 247 or 261 as described above or can be a standalone application 245, which operates in conjunction with the decoder. In one embodiment, the P2P streaming module operates on top of the Internet Protocol (IP) or other networking protocol as well known in the art. The P2P streaming module is further configured to provide information that identifies device 200, including a type, capability, name, or the like. In one embodiment, device 200 may uniquely identify themselves through any of a variety of mechanisms, including a phone number, Mobile Identification Number (MIN), an electronic serial number (ESN), mobile device identifier, network address, or other identifier.

In a further embodiment, the P2P streaming module 248 is configured to perform peer indexing and discovery. In particular, the P2P streaming module 248 may broadcast through network interface 250 a message, such as the "Hello" message, to each network devices in system 100. The message also identifies certain data, such as a digital video file, that device 200 requests from other devices in the system. Upon receiving responses, the P2P streaming module 248 identifies a number of network devices that has the requested data and assigns an identification (ID) to each of these network devices. In addition, the P2P streaming module 248 also conducts negotiations with other network devices to determine transmission rates, bandwidth, packet size, etc. For example, the P2P streaming module 248 may exam the responses received from the network devices that have the requested data, and select a predetermined number of network devices according to the uplink data rate or bandwidth offered by these network devices.

In addition, P2P streaming module 248 can further provide data assembling, retransmission request, and error correction. For example, P2P streaming module 248 can generate a copy of the requested data by assembling the data streams received from a plurality of computing devices in system 100. Upon discovering that one or more portions of the data are missing or contain errors, P2P streaming module 248 can request retransmissions of the unavailable data and/or correct the errors by applying an error correction method to the received data.

Illustrative Network Devices 107-109

Figure 3:
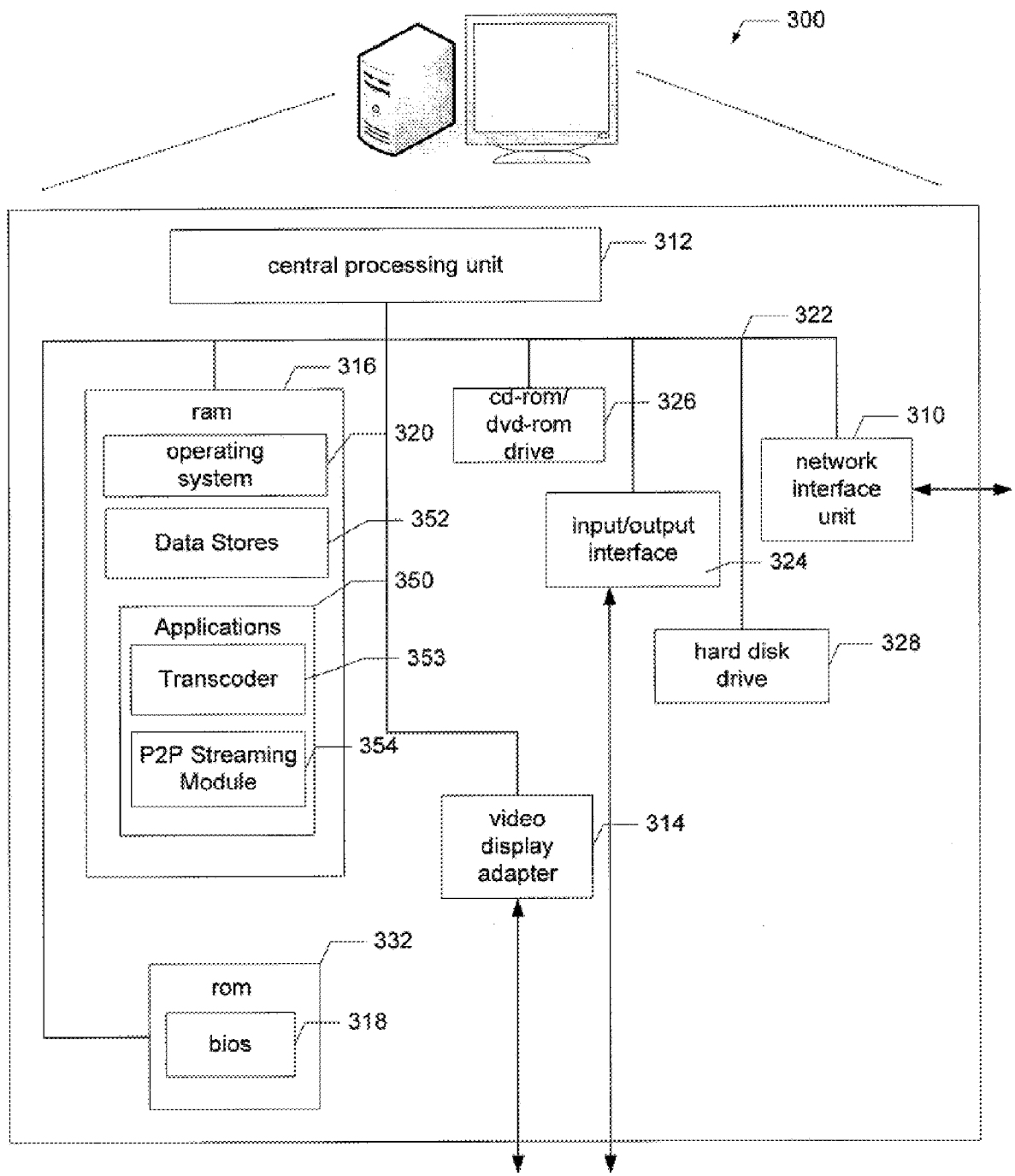
FIG. 3 depicts a schematic diagram of the fixed network device shown in FIG. 1.

FIG. 3 shows one embodiment of network devices 300. Network device 300 may include many more or less components than those shown. The components shown, however, are sufficient to disclose an illustrative embodiment for practicing the invention. Network device 300 may represent, for example, network device 107-109 of FIG. 1 and/or network device 105 of FIG. 1.

Specifically, network device 300 includes processing unit 312, video display adapter 314, and a mass memory, all in communication with each other via bus 322. The mass memory generally includes RAM 316, ROM 332. and one or more permanent mass storage devices, such as hard disk drive 328, tape drive, optical drive, and/or floppy disk drive. The mass memory stores operating system 320 for controlling the operation of network device 300. Any general purpose operating system may be employed. Basic input/output system ("BIOS") 318 is also provided for controlling the low-level operation of network device 300. As illustrated in Fla 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network device 300 further includes an input/output interface 324 and a cd-rom/dvd-rom drive 326.

The mass memory as described above illustrates another type of computer-readable media, namely computer storage media. As used herein, such computer-readable storage media refers to physical, tangible devices. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical devices which can be used to store the desired information and which can be accessed by a computing device.

RAM 316 may include one or more data stores 352, which can be utilized by network device 300 to store, among other things, applications 350 and/or other data. RAM 316 can also be used to store database information. The mass memory also stores program code and data. One or more applications 350 are loaded into mass memory and run on operating system 320 by central processing unit 312. Examples of application programs may include transcoder 353, p2p streaming module 354, schedulers, calendars, database programs, word processing programs, HTTP programs, customizable user interface programs, IPSec applications, encryption programs, security programs. SMS message servers. IM message servers, email servers, account managers, and so forth.

Similar to P2P streaming module 248, P2P streaming module 354 provides various functions required by the P2P transmission of data, including identification of device 300 and other computing devices within system 100, index and discovery, data assembling, error correction, etc.

Figure 4:
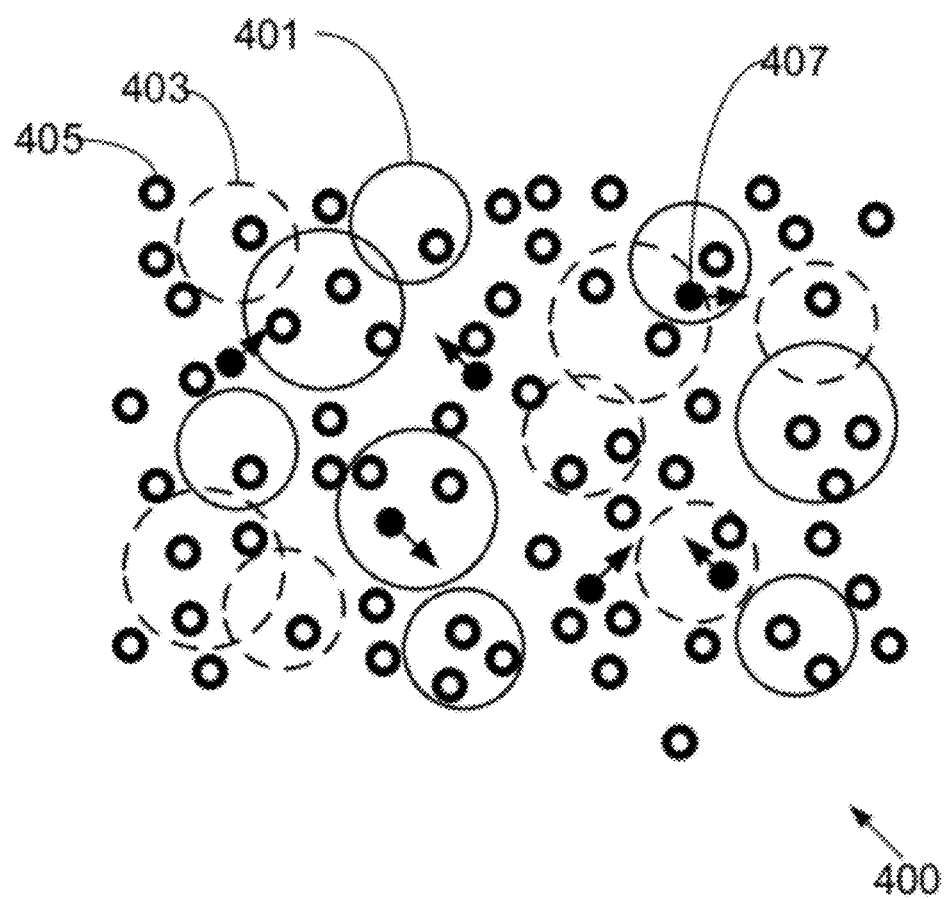
FIG. 4 is a schematic illustration of a module CRN including Mobile CFR devices within which the described principles may be implemented.

Referring now to FIG. 4, in an embodiment of the invention, the exemplary CRN 400 includes infrastructure-based fixed primary networks 401 and mobile ad-hoc secondary networks 403 in the same geographical area, as shown in FIG. 4. Fixed units 405 are shown as small open discs while mobile units 407 are shown as solid vectored discs.

The model assumes a non-empty set κ of licensed channels where the number of channels is much smaller than the number of SUs in the network. For PUs, it is assumed that each cell consists of a single access point (AP) and multiple receivers. PUs operating on the same channels are assumed to belong to the same type of systems and to have same temporal channel usage statistics, e.g., average channel busy/idle time durations. PUs are further assumed to be distributed following a point Poisson process with different average density for each channel, i.e., $n_{p,i}$~Poi(k; $\rho_{p,i}$); where $\rho_{p,i}$ is the average PU density on channel i∈κ. Each of these assumptions is of course an approximation as it will not hold strictly in each and every instance.

It is assumed that SUs are mobile, but do not have capability of accessing geo-location spectrum database to obtain local spectrum availability information. Therefore, each SU must rely on local spectrum sensing (i.e., feature detection) to identify the availability of the channels, i.e., the presence/absence of primary signals. To avoid causing excessive interference to primary communications, SUs are allowed within the model to access any licensed channels in the set κ, only when their distance relative to any active primary transmitter is larger than a certain threshold, i.e., outside the primary protection area.

SUs individually make decisions on the presence/absence of a primary signal based on local spectrum sensing result, using feature detection as a PHY-layer sensing technique. Feature detection provides high accuracy even without sensor collaboration, and is thus suitable for ad-hoc secondary networks, where collaboration among sensors may not be feasible due to the needs for information exchange and global time synchronization.

Figure 5:
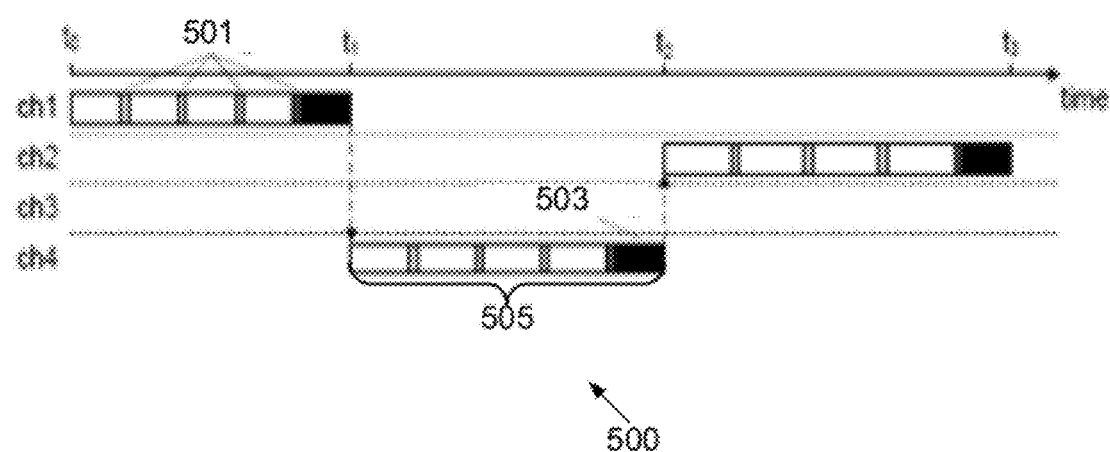
FIG. 5 is a time access plot showing Opportunistic channel access model behavior within an embodiment of the invention.

Once an SU detects and selects an available channel, it will access the channel by contending with other neighboring SUs on the same channel via a suitable random access scheme such as CSMA (Carrier Sense Multiple Access). The spectrum access behavior of an SU is depicted in the multi-channel time plot 500 of FIG. 5. SUs are assumed to generally use maximum transmission power allowed by regulation when accessing the channel. The SU behavior as a function of time includes sensing intervals 501 and switching intervals 503. Three channel usage epochs 505 are shown in FIG. 5.

To maximize the secondary throughput performance, it is important to accurately estimate spectrum availability from a mobile SU's perspective. A mobility-aware channel availability model takes into account the mobility of SUs and spatio-temporal spectrum opportunities due to PU's spatial distributions and temporal traffic patterns. It is assumed that primary transmitters on the licensed channel i∈κ are separated by at least twice their interference range, $R_i$ in order to avoid mutual interference. For example, in practice, TV transmitters are deployed far enough from each other to minimize the inter-cell interference. Under this assumption, the density of primary transmitters can be derived by eliminating such overlapping PUs in the original Poisson process, called Marten Hardcore Process. Then, the density of primary transmitters after such elimination is given as:

$$\rho_{p,i} = \frac{1 - \exp(-4\rho_{m,i}\pi R_i^2)}{4\pi R_i^2}, \quad (1)$$

where $\rho_{m,i}$ is the primary transmitter density in the original point Poisson process The keep-out radius is defined as:

$$R_{e,i} \inf\{d \in \mathbb{R} \mid I_{tot}(\rho_{s,i}) \leq ITL\}, \quad (2)$$

where $I_{tot}(\rho_{s,i})$ is the total interference generated by SUs at a primary receiver located at the edge of the primary coverage area, $\rho_{s,i}$ the density of secondary transmitters on channel i, and ITL the interference temperature limit set by an applicable regulatory body such as the FCC.

The aggregated interference caused by the SUs in the network at a primary receiver located at the boundary of the primary coverage (transmission) range (the worst case scenario) can be upper bounded as:

$$I_i^U(\rho_{s,i}, R_{e,i}) = \frac{2\pi P_o d_o^\alpha \rho_{s,i}}{\alpha - 2}(R_{e,i} - R_o)^{2-\alpha}, \quad (3)$$

where $P_o$ is the transmit power of SUs, $d_o$ the short reference distance (e.g., 5 m), α the path-loss exponent, $\rho_{s,i}$ the average SU density on channel i, and $R_{e,i}$ the primary keep-out radius.

From Eq. (3), the keep-out radius for channel i, $R_{e,i}$, i.e., the minimum separation between the primary transmitter and secondary transmitters to meet the interference constraint, i.e., is given as:

$$R_{e,i}(\rho_{s,i}) = \left[\left(\frac{(\alpha - 2)}{2\pi P_o d_o^\alpha \rho_{s,i}} \cdot ITL\right)^{\frac{1}{2-\alpha}}\right]^+ + R_o, \quad (4)$$

where $[\bullet]^+ \triangleq \max\{\bullet, 0\}$

Figure 6:
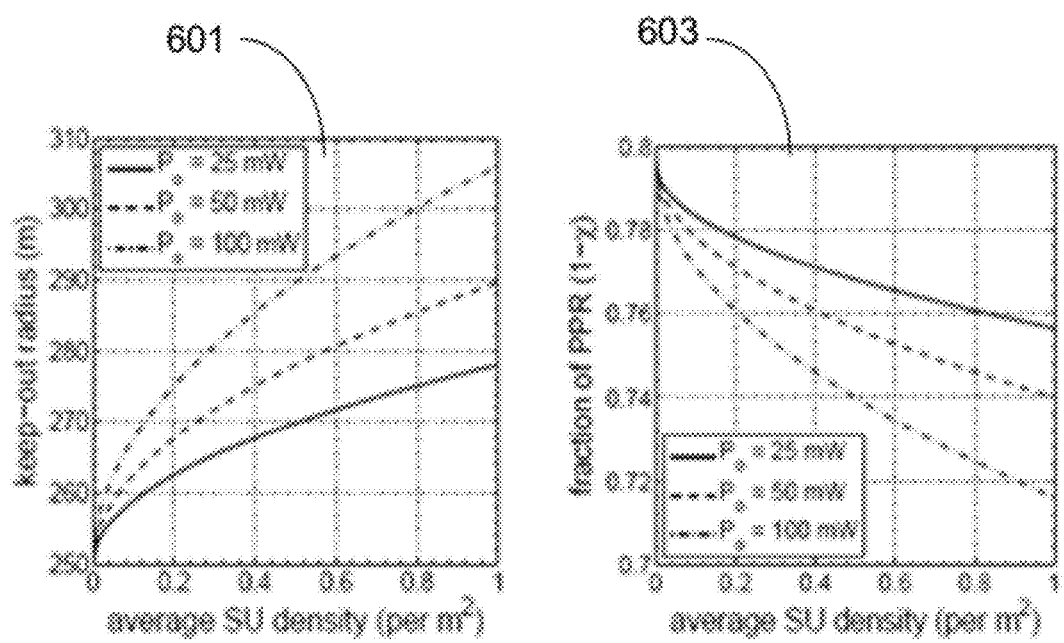
FIG. 6 illustrates data plots showing the impact of SU density on spatial spectrum opportunity within the model according to an embodiment of the invention.

Regarding Eq. (4), it should be noted that the keep-out radius of channel i increases as the average SU density, increases, as shown in FIG. 6, radius-density plot 601. This is because, a higher SU density will increase the aggregated interference at a primary receiver, and thus, the keep-out radius must be expanded to meet the interference constraint. FIG. 6 also shows a plot 603 of fraction of primary protection region (PPR) versus average SU density.

The keep-out radius in Eq. (4) is, however, derived assuming all the SUs are stationary and may not provide sufficient protection when SUs are mobile. A mobile SU can move close to a PU and cause significant interference before detecting the primary signal. To protect PUs from such mobility-induced interference, an additional protection layer (guard distance) is provided, denoted as $\epsilon_i$.

With respect to the primary protection region, it is assumed that $\mathcal{P}_i$ denotes a set of primary transmitters on channel i. A primary protection region (PPR) of primary transmitter $j \in \mathcal{P}_i$, denoted as $\Omega_{i,j}$ is defined as a unit disk centered at the primary transmitter j located at $(x_{i,j}, y_{i,j})$, i.e., $$\Omega_{i,j} = \{(x,y) \in \mathbb{R}^2 \mid \|(x_{i,j}, y_{i,j}) - (x,y)\| \leq R_{e,i} + \epsilon_i\}, \quad (5)$$

where $R_{e,i}$ is the keep-out radius, and $\epsilon_i$ the guard distance. In this way, the average fraction of the keep-out regions of all the PUs on channel I, $\Omega_{i,j}$, in the entire network at any given time is:

$$\chi_i(\rho_{s,i}) = 1 - e^{-\rho_{p,1}\pi(R_{e,i}(\rho_{s,i})+\epsilon_i)^2}, \quad (6)$$

where $\rho_{s,i}$ is the average secondary density on channel i. Then, the average fraction of areas where the channel is available can be approximated as:

$$\Gamma_i \approx (1-\chi_i) + \chi_i \pi_{idle,i} = 1 - \chi_i \pi_{busy,i}, \quad (7)$$

where $\pi_{idle,i}$ is the steady-state probability that a primary transmitter on channel I is not transmitting data, i.e., is in an Idle state.

To model the channel availability from a mobile SU's perspective, three primary assumptions are provided. In particular, it is assumed that the PUs' traffic statistics, i.e., busy/idle periods, the time interval that an SU moves inside a PPR, and the time during which an SU is located within a PPR all follow exponential distributions. Regarding the first assumption, studies indicate that the channel usage pattern can be accurately approximated as an exponential distribution unless the average busy/idle periods are very long. Regarding the second assumption, let $T_{hit}$ denote the first (hitting) time that a mobile SUn moves into a PPR of an active PU (i.e., in busy state). Then, the analysis of $T_{hit}$ is analogous to the hitting time of a stationary object in a wireless sensor network. Thus, $T_{hit}$ can be approximated as:

$$T_{hit,i} \sim \text{Exp}(2(R_{e,i}+\epsilon_i)\bar{v}_n \rho_{p,i} \pi_{busy,i}), \quad (8)$$

where $\bar{v}_n$ is the average speed of SUn.

Regarding the third assumption, the time duration during which an SU stays within a PPR can be derived from the link-lifetime distribution analysis in a mobile ad-hoc network. The link lifetime, i.e., the time duration at which transmitter-receiver pair is located closer than a transmission range, can be accurately approximated as an exponential distribution with intensity $$\frac{\bar{v}}{R}$$

where $\bar{v}$ is the relative speed of the transceiver and R is the transmission range.

Figure 7:
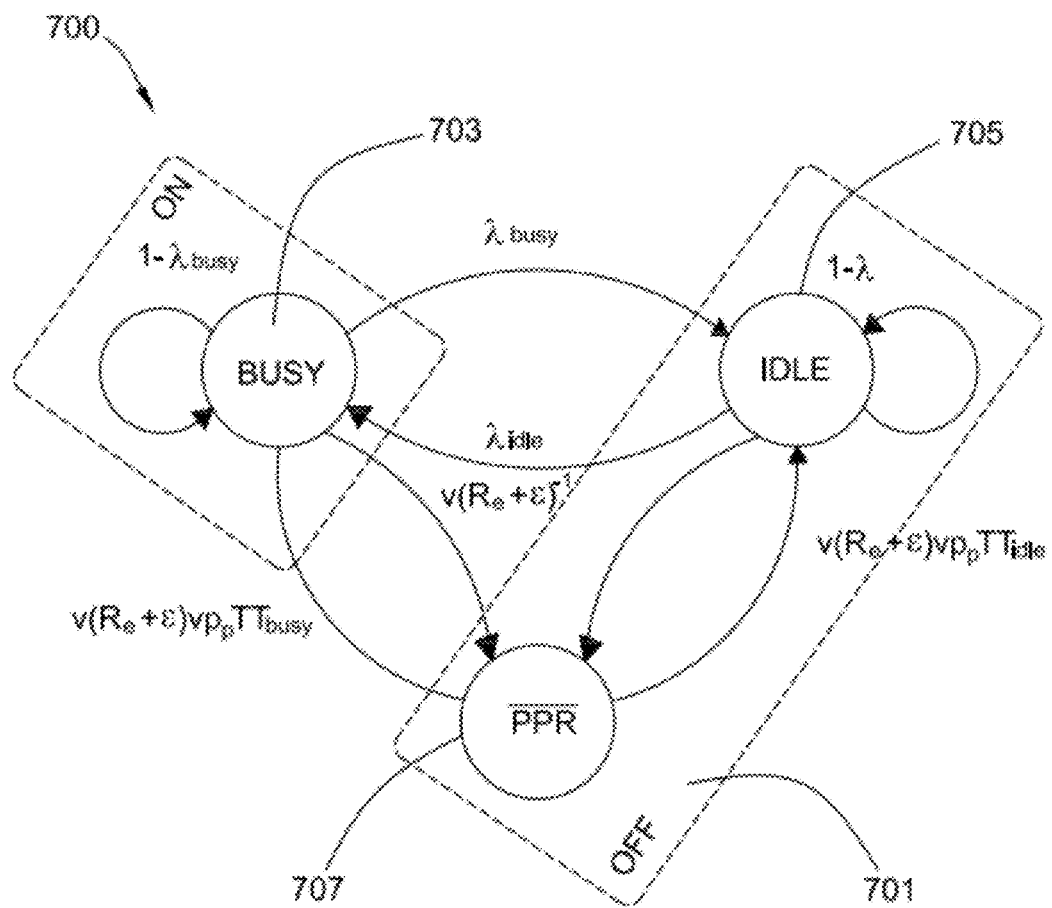
FIG. 7 is a mobility aware channel availability state model according to an embodiment of the invention.

With respect to designing a SUs' mobility-aware channel availability model for mobile CRNs, three states are defined based on the SU's location relative to the PPRs and PUs' traffic patterns, as shown in the state transition diagram 700 of Fig. 7. It is assumed that channel i is available (ie, OFF state 701) when a mobile SU is located outside the PPR of any active primary transmitters on channel i (i.e., idle 705 or PPR 707); otherwise, the channel is not available (i.e., busy state 703). Thus, the Markov chain can be reduced into a two-state model by merging the states idle 705 and PPR 707 states into an OFF state 701, as shown in FIG. 7. The state transitions occur in the following cases:

ON→OFF: An SU moves out of the protection region of an active PU or a PU stops transmitting data.

OFF→ON: An SU moves into the protection region of an active PU or a PU starts transmitting data.

The distributions of ON (unavailable) and OFF (available) durations are derived based on the Markov model in FIG. 7. Regarding the distribution of the "ON" Period, a channel becomes available, i.e., OFF to ON, either when PU stops transmitting (i.e., busy to idle) or when an SU moves out of the PPR, both assumed to be following exponential distributions. Thus, the sojourn time of the ON state of channel i also follows an exponential distribution:

$$T_{on,i} \sim \text{Exp}\left(\lambda_{busy,i} + \frac{\bar{v}_n}{R_{e,i} + \epsilon_i}\right), \quad (9)$$

where $\lambda_{busy,i}$ is the rate, at which a PU resumes data transmission, $\bar{v}_n$ the average speed of an SU, and $R_{e,i}$ and $\epsilon_i$ are the keep-out radius and guard distance on channel i, respectively.

With respect to the distribution of the "OFF" Period, a channel becomes unavailable, i.e., OFF to ON, either when a PU starts transmission (i.e., idle to busy) or an SU moves inside the PPR of an active PU (i.e., PPR to busy). Therefore, the OFF period duration is a hitting time of the busy state having either idle or PPR as an initial state. The OFF to ON state transition probability can be derived using the global balance equation, based on the steady-state probability of the ON/OFF states, i.e., $\pi_{on,i}=1-\Gamma_i$ and $\pi_{off,i}=\Gamma_i$, the ON to OFF transition rate $\lambda_{on,i}$ in Eq. (9), i.e., $$\lambda_{off,i} = \frac{\chi_i \pi_{busy,i}}{1-\chi_i \pi_{busy,i}}\left(\lambda_{busy,i} + \frac{\bar{v}_n}{R_{e,i}+\epsilon_i}\right), \quad (10)$$

and thus, the sojourn time of the OFF state is given as:

$$T_{off,i} \sim \text{Exp}(\lambda_{off,i}) \quad (11)$$

Figure 8:
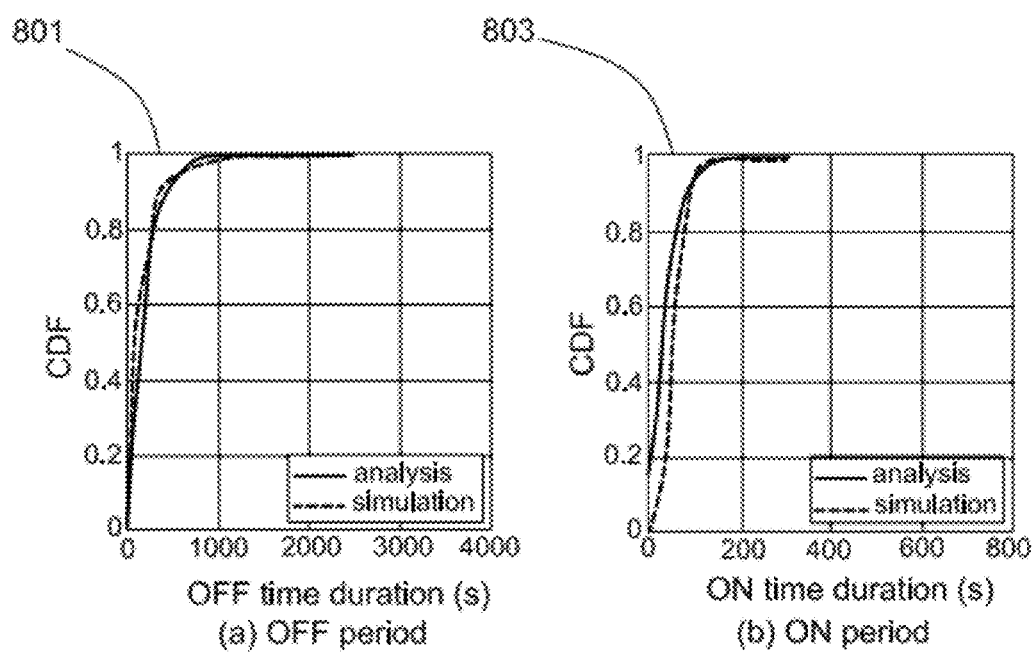
FIG. 8 is a collection of plots comparing channel On/Off duration distribution according to an embodiment of the invention.

To show the accuracy of the proposed channel availability model, the inventors measured the channel ON/OFF periods via simulations. The duration plots 801 and 803 of FIG. 8 compare the empirical cumulative distributed function (c.d.f.) of channel ON/OFF time durations with the analytical results in Eqs. (9) and (11). The duration plots 801 and 803 show that the empirical results closely match the analytical results, corroborating the accuracy of the proposed model. To further quantify the accuracy of the model, the inventors measured the Kullback-Leibler Divergence (KLD) that indicates the distance between two distributions. The KLD for two exponential distributions with true distribution with $\lambda_o$ and estimated distribution with $\lambda_1$ is given as:

$$D_{KL}(\lambda_0 \| \lambda_1) = \log(\lambda_0) - \log(\lambda_1) + \frac{\lambda_1}{\lambda_0} - 1. \quad (12)$$

Figure 9:
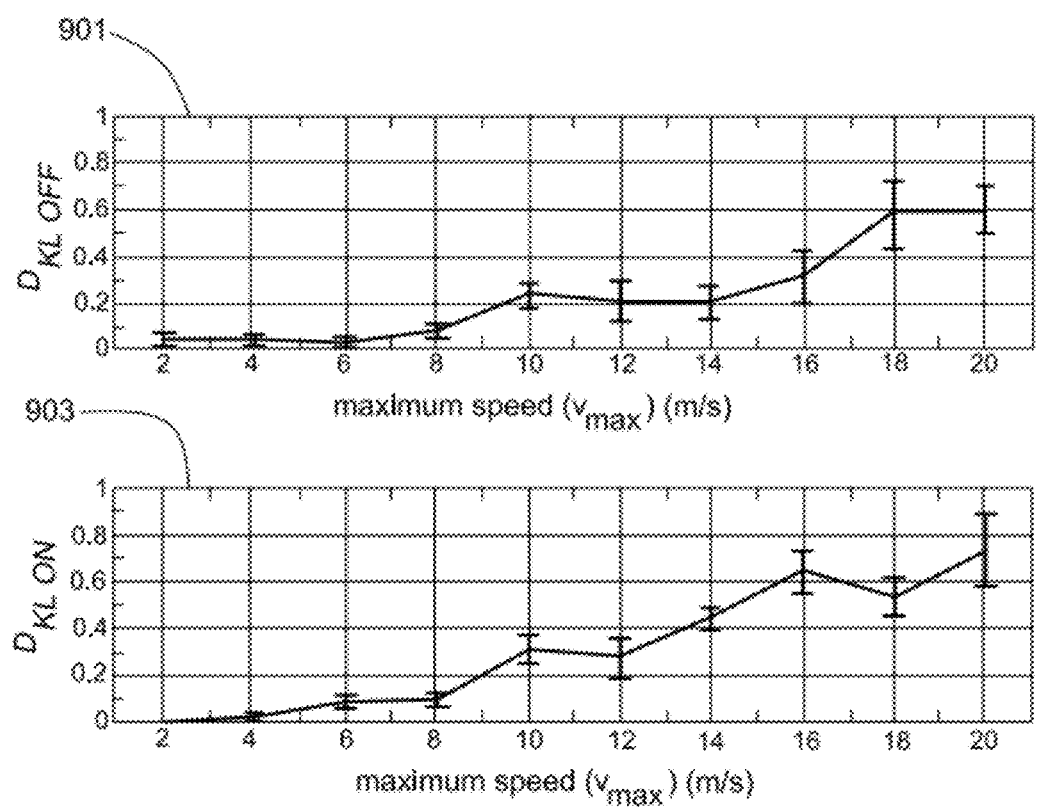
FIG. 9 is a collection of plots showing the accuracy of a channel model according to an embodiment of the invention.

The KLD plots 901 and 903 of FIG. 9 plot the average and ±0.5σ interval of KLD for the ON/OFF durations while varying the maximum speed of SUs in the range of [2, 50] m/s. The figure shows that the KLD increases as the maximum speed of the SU's increases for both ON/OFF periods. This is because the estimation of the ON/OFF durations becomes less accurate as the channel ON/OFF status has monitored at a discrete spectrum sensing interval of 1 second.

As noted above, embodiments of the invention provide primary protection via joint optimization of spectrum sensing interval and guard distance. The minimum spectrum sensing interval is selected such that it minimizes spectrum sensing time overhead under primary interference constraints. From this, an optimal guard distance is derived to maximize the spatio-temporal spectrum opportunities.

in order to avoid causing excessive interference to primary communications, SUs perform spectrum sensing frequently enough so as to detect the presence of a primary signal before they move into the PPR of active PUs, it is assumed that spectrum sensing can perfectly detect the presence of primary signal when an SU is located within the PPR of any active PUs. This level of sensitivity can he accomplished by adjusting the detection threshold of feature detection.

In this model, an SU senses its operating channel either (i) when the c.d.f. of the channel busy state reaches a predefined threshold, $\xi(0<\xi<1)$ or (ii) when it travels a certain distance, whichever comes first. The inverse c.d.f. of the channel OFF period is given by $$\mathbb{F}^{-1}(\xi; \lambda_{off}) = \frac{-\ln(1-\xi)}{\lambda_{off}}.$$

The lower the probability $\xi$, the more frequently the SUs will sense the channel. Then, the minimum sensing interval of an SU on channel i can be expressed as:

$$t_i^* = \max\left\{T_{s,i}, \min\left\{-\frac{\ln(1-\xi)}{\lambda_{off}}, \frac{\epsilon_i}{\bar{v}}\right\}\right\}, \quad (13)$$

where $\lambda_{off}$ is the intensity of the distribution of the channel OFF period, $\epsilon_i$ the guard distance, and $\bar{v}$ the average speed of an SU. The second term guarantees that an SU performs sensing at least once before it moves into the keep-out radius $R_{e,i}$. Therefore, SUs preferably adjust their sensing interval based on their speed.

Figure 10:
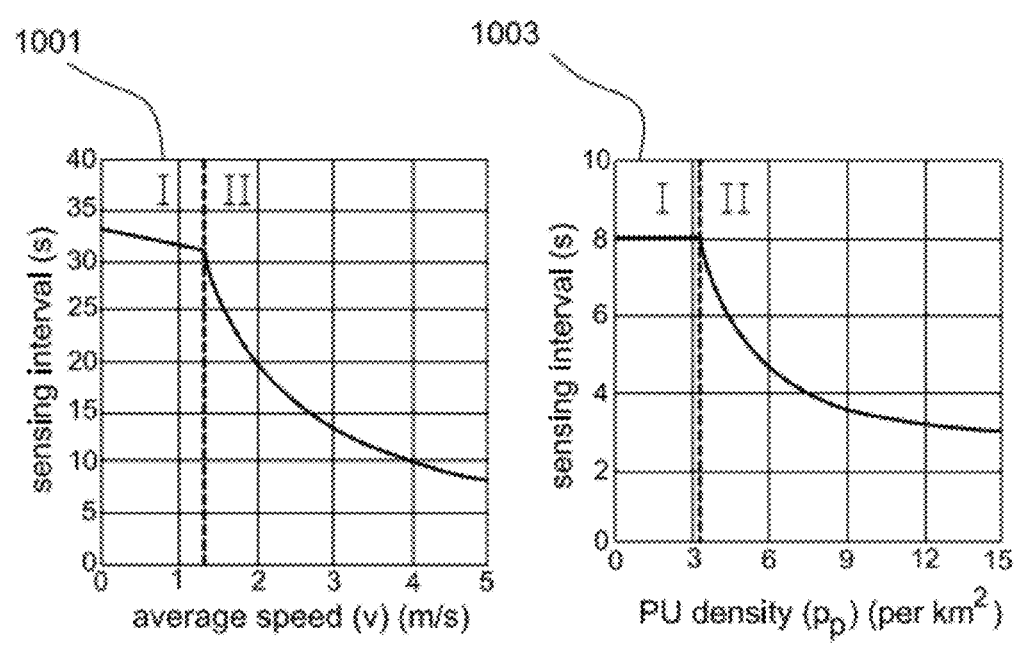
FIG. 10 is a collection of plots showing reliance of sensing interval on PU speed and density according to an embodiment of the invention.

As Eq. (13) indicates, the minimum sensing interval depends not only on temporal features such as primary traffic statistics, but also spatial features such as SU's average speed $\bar{v}_n$ and primary density $\rho_{p,i}$. The sensing interval plots 1001 and 1003 of FIG. 10 illustrate this behavior. Plot 1001 shows that, when an SU moves slowly (Region I), the sensing interval will be determined by the PUs' traffic patterns, i.e., $\lambda_{idle}$, whereas when the SU moves more quickly (Region II), the interval will be determined by the speed of SUs. Plot 1003 shows that, when PU density is low (Region I), sensor mobility determines the sensing interval, and the interval is determines by primary traffic patterns when PU density increases (Region II). In summary, in mobile CRNs, not only the temporal features (e.g., PUs' traffic patterns), but also the spatial features (e.g., sensor mobility and PU distribution) are taken into account in the design of the spectrum sensing.

Under the assumption of no spectrum sharing, the average channel utilization of channel i∈κ is defined as follows:

$$u_{i,n} = \mathbb{E}\left\{1 - \frac{\sum_{j=1}^{N_{s,i,n}} T_{s,i} - T_{sw,i}}{T_i}\right\}, \quad (14)$$

where $N_{s,i,n}$ is the number of spectrum sensing performed by SUn within the channel access epoch $T_i$, and $T_{s,i}$ and $T_{sw,i}$ are the time spent for a one-time sensing and switching for channel i, respectively. Without loss of generality, it is assumed that $T_s = T_{s,i} \ \forall_i$ and $T_{Sw} = T_{sw,i} \ \forall_i$.

With respect to the selection of the guard distance, $\epsilon$, this selection entails a tradeoff in exploring space and time domain spectrum opportunities. That is, a larger guard distance (thus enlarging the area of PPRs) will reduce the amount of spatial spectrum opportunities, while allowing mobile SUs to increase the sensing interval (see Eq. (13) increases spectrum opportunity in the temporal domain.

With respect to spatio-temporal spectrum opportunity, availability of channel i∈κ in spatio-temporal domain, denoted as $\Lambda_i$, is defined as the long-term average fraction of the time a mobile SU can access the channel, i.e., $\Lambda_i = \Gamma_i \upsilon_i$ where $\Gamma_i$ and $\upsilon_i$ are defined in Eqs. (7) and (14), respectively.

Figure 11:
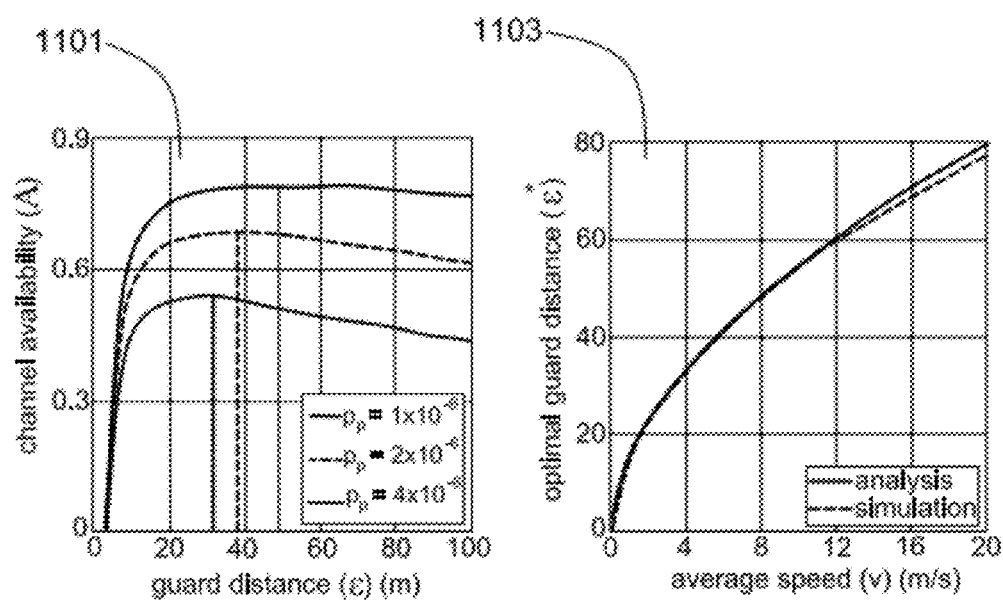
FIG. 11 is a collection of plots showing optimal design of the guard distance according to an embodiment of the invention.

The effects of guard distance are seen in plots 1101 and 1103 of FIG. 11, which plot channel availability versus guard distance and optimal guard distance versus average speed respectively. Plot 1101 of FIG. 11 plots the spatio-temporal channel availability $\Lambda_i$ for various guard distances. The plot 1101 shows that when the guard distance _ is too small, i.e., $\epsilon_i < 3$ m, $\Lambda_i = 0$ because of the need for sensing the channel continuously, i.e., $t_i^* = T_{s,i}$. When $\epsilon_i$ is relatively small, $\Lambda_i$ suffers from a large sensing (temporal) overhead, whereas when $\epsilon_i$ is too large, spatial spectrum opportunity decreases considerably. On the other hand, when $\epsilon_i$ too large, $\Lambda_i$ decreases due to a large spatial overhead.

In an embodiment of the invention, the optimal guard distance $\epsilon^*$ that maximizes the spatio-temporal spectrum opportunity, $\Lambda_i$, is given as:

$$\epsilon_i^* = \frac{R_{e,i}\bar{v}T_{s,i} + \sqrt{(R_{e,i}\bar{v}T_{s,i})^2 + \frac{2\bar{v}T_{s,i}(R_{e,i} - \bar{v}T_{s,i})}{\pi\rho_{p,i}\pi_{busy,i}}}}{2(R_{e,i} - \bar{v}T_{s,i})}, \quad (15)$$

where $R_{e,i}$ is the keep-out radius, $\bar{v}$ the average speed of SUs, $T_{s,i}$ the sensing time, $\rho_{p,i}$ the primary density, and $\pi_{busy,i}$ the steady-state probability of channel busy state of channel i.

By way of verification, the average fraction of area which is not covered by the PPRs can be approximated as $\Gamma_i(\epsilon_i) \approx e^{-f(\epsilon_i)}$ where $f(\epsilon_i) = \rho_{p,i}\pi_{busy,i}\pi(R_{e,i}+\epsilon_i)^2$. Assuming the switching overhead is negligible compared to the average OFF period, i.e., $T_{sw} \ll \lambda_{off}^{-1}$, $\upsilon_i$ can be approximated as $$u_i \approx 1 - \frac{\bar{v}T_{s,i}}{\epsilon_i}.$$

Thus, the channel availability in the spatio-temporal domain can be expressed as $\Lambda_i(\epsilon_i) \approx \Gamma_i(\epsilon_i)\upsilon_i(\epsilon_i)$, i.e., $$\Lambda_i(\epsilon_i) \approx e^{-f(\epsilon_i)}\left(1 - \frac{\bar{v}T_{s,i}}{\epsilon_i}\right). \quad (16)$$

By then taking the first order derivative of $\Lambda(\epsilon_i)$ and set it equal to zero, the result is given as:

$$e^{-f(\epsilon_i)}\left(-2\pi\rho_{p,i}\pi_{busy,i}(R_{e,i}+\epsilon_i)\left(1 - \frac{\bar{v}T_{s,i}}{\epsilon_i}\right) + \frac{\bar{v}T_{s,i}}{\epsilon_i^2}\right) = 0. \quad (17)$$

For mathematical simplicity, it is assumed that the term $2\pi\rho_{p,i}\pi_{busy,i}\epsilon_i \approx 0$ in Eq. (17), thus yielding the following quadratic equation:

$$(R_{e,i} - \bar{v}T_{s,i})\epsilon_i^2 - R_{e,i}T_{s,i}\epsilon_i - \frac{\bar{v}T_{s,i}}{2\pi\rho_{p,i}\pi_{busy,i}} = 0. \quad (18)$$

By solving Eq. (18), the model is verified.

As can be seen in plot 1103 of FIG. 11, the optimal guard distance increases as the average speed of the SUs increases. This implies that when SUs are highly mobile, it is preferable to increase the guard distance at the cost of reduced spatial spectrum opportunity, rather than reducing the sensing interval in the temporal domain.

With respect to distributed spectrum access strategy in mobile CRNs, the optimal channel selection (access) strategy that maximizes each secondary link's throughput can now be seen. In multiuser CRNs, it is important to consider the channel contention overhead as it can affect the achievable throughput significantly. However, it may infeasible for mobile SUs to estimate the interference on each channel in real-time. Thus, it is assumed that all the SUs in the network follow the same channel access strategy, and derive an optimal strategy by taking into account the interference among SUs as follows.

The total number of SUs in the network can be estimated as $N \approx \rho_x A$ where $A$ is the entire network area and $\rho_s$ is the average SU density. The mixed channel selection vector is denoted by $P=[p_1; p_2; \ldots, p|\kappa|]^T$ where $\Sigma_{i \in \kappa} p_i = 1$. Further, the total number of SUs selecting channel i in the network can be approximated as $Np_i$. The ratio of SU's, interference region to the total network area is denoted by $$f_i = \frac{\pi R_{I,i}^2}{A},$$

where $R_{I,i}$ is the interference range of an SU on channel i. Then, the probability that an arbitrarily chosen SU on channel i has $m \in \mathbb{N}$ interfering neighbors that have chosen the same channel follows a binomial distribution, i.e., $M_i \sim \text{Bin}(m; Np_i-1, f_i)$.

Consequently, the expected link throughput of an SUn can be expressed as:

$$E[R_n] = \sum_{i=1}^{K} p_i \sum_{m=0}^{N_{p_i}-1} \frac{\Lambda_i}{m+1} \binom{N_{p_i}-1}{m} f_i^m (1-f_i)^{N_{p_i}-m-1} \quad (19)$$

$$= \frac{1}{N} \sum_{i=1}^{K} \Lambda_i \left[ \frac{1-(1-f_i)^{N_{p_i}}}{f_i} \right],$$

where $K=|\kappa|$ is the total number of licensed channels. Then, the problem of finding an optimal channel selection strategy $P^*$ can be cast into the following optimization problem (P1):

$$\text{minimize } \mathbb{F}(p) = -\sum_{i=1}^{K} \Lambda_i \left( \frac{1-\bar{f}_i^{N_{p_i}}}{f_i} \right),$$

$$\text{subject to } \sum_{i=1}^{K} p_i = 1 \text{ and } p \geq 0,$$

where $\bar{f}_i = 1 - f_i$ for brevity.

To find the optimal sensing strategy $P^*$, the convexity of $\mathbb{F}(p)$ is first shown. The second order derivative of $\mathbb{F}(P)$ w.r.t. $p_i$ is given as:

$$\frac{\partial^2 \mathbb{F}(p_i)}{\partial p_i^2} = \bar{f}_i^{N_{p_i}} \left( \ln(\bar{f}_i^N) \right)^2 > 0. \quad (50)$$

The inequality in Eq. (50) is straightforward to show since $0<\bar{f}_i=1-f_i<1$, $N>0$, and $p_i>0$. Hence, $\mathbb{F}(p)$ is convex in $P \in [0, 1]^K$. Since the objective function is convex and constraints are affine, we now have a convex optimization problem. The Lagrangian L with multipliers $\lambda \in \mathbb{R}^K$ and $\nu \in \mathbb{R}$ is given as:

$$L(p, \lambda, \nu) = \sum_{i=1}^{K} \Lambda_i (\bar{f}_i^{N_{p_i}} \ln(\bar{f}_i^N)) - \sum_{i=1}^{K} \lambda_i p_i + \nu \left( \sum_{i=1}^{K} p_i - 1 \right)$$

$$= -\sum_{i=1}^{K} ((\lambda_i - \nu) p_i - \Lambda_i (\bar{f}_i^{N_{p_i}} \ln(\bar{f}_i^N))) - \nu,$$

where $\lambda \geq 0$ and $\nu = 0$. The Lagrange dual function, i.e., the minimum value of the Lagrangian over P, is given as:

$$g(\lambda, \nu) = \inf_p L(p, \lambda, \nu)$$

$$= \sum_{i=1}^{K} \inf_p \left( -(\lambda_i - \nu) p_i + \Lambda_i (\bar{f}_i^{N_{p_i}} \ln(\bar{f}_i^N)) \right) - \nu.$$

It can then be seen that there exists p such that the constraints hold with strict inequality, i.e., $p_i > 0 \forall i$ and $\Sigma_{i=1}^{K} p_i = 1$. Therefore, according to Slater's condition, strong duality holds with zero optimal duality gap.

The Karush-Kuhn-Tucker (KKT) conditions for optimality are given as:

$$p^* \geq 0, \sum_{i=1}^{K} p_i^* = 1 \quad (21)$$

$$p_i^* (\lambda^* + \Lambda_i f_i^{-1} \bar{f}_i^{N_{p_i}} \ln(\bar{f}_i^N)) = 0 \quad (22)$$

$$\lambda^* + f_i^{-1} \bar{f}_i^{N_{p_i}} \ln(\bar{f}_i^N) \geq 0. \quad (23)$$

By solving the above problem, the optimal channel selection strategy, $P^*$, is derived as described in the following proposition.

The optimal channel selection vector $P^*$ that maximizes the expected secondary network throughout is given as:

$$p_i^* = \begin{cases} \left[ \frac{-\ln(\Lambda_i) + \ln(f_i) + \ln(-N\ln(\bar{f}_i)) - \ln(\lambda^*)}{N \ln(\bar{f}_i)} \right]^+ & \text{if } \pi_{idle,i} > 0 \\ 0 & \text{if } \pi_{idle,i} = 0, \end{cases}$$

where $\Lambda_i = \Gamma_i \nu_i$ and $\lambda^*$ is a constant s.t. $\Sigma_{i=1}^{K} p_i = 1$. Eq. (24) indicates that the probability $p_i$ increases as the channel availability $\Lambda_i$ increases.

Perhaps counterintuitively, the optimal channel selection probability becomes independent of the spatio-temporal spectrum opportunities $\Lambda_i$, i.e., $$p_i^* \to \frac{1}{K} \forall i \text{ as } N \to \infty, \quad (25)$$

where $\kappa$ is the number of licensed channels, and N the total number of SUs in the network.

As can be seen, the optimal channel selection probability $P^*$ in Eq. (24) is affected by the SU density on each channel. This is due to the fact that as the SU density increases, the area of PPR needs to be enlarged, resulting in the reduced spatial spectrum opportunity. This coupling between channel selection strategy and the spatial channel availability benefits from an iterative algorithm to find the optimal strategy:

| Algorithm 1 OPTIMAL CHANNEL SELECTION ALGORITHM |
|---|
| 1: Initialization |
| 2: $P \leftarrow \left[\frac{1}{K}, \ldots, \frac{1}{K}\right]^T$ // Channel selection probability |
| 3: $p_{prev} \leftarrow p$ |
| 4: $\Delta \leftarrow \infty$ |
| 5: $\epsilon \leftarrow 1$ |

```
Algorithm 1 OPTIMAL CHANNEL SELECTION ALGORITHM

6: while (Δ > ε) do
 7:    Update the SU density on each channel ρ_{s,i} ← ρ_s p_i
 8:    Update the keep-out radius R_{c,i} using Eq. (41)
 9:    Update the optimal guard distance ε_i*
10:    Update the spatio-temporal channel availability Λ_i(ε_i*)
11:    Update the channel selection probability p using Eq. (24)
12:    Δ ← p − p_{prev}
13:    p_{prev} ← p
14: end while
15: return p
```

The performance of proposed algorithms was evaluated via both numerical and simulation study. The evaluation considered a CRN wherein mobile SUs coexist with PUs in a 5×5 km² area. It was assumed that there are 5 licensed channels and that the PU density on each channel is in the range of $[0.12] \times 10^{-6}/m^2$ and the average channel idle probability is in the range of [0.3 0.7], unless specified otherwise. For all the channels set_idle=0.1 and the average density of SUs was assumed in the range of $\rho_s=[1, 10]\times 10^{-6}/m^2$. In simulations, the path-loss exponent was set α=4, the transmit power of the SUs was set as $P_n$ =100 mW, the reference distance was set as $d_o=1$, the transmission range of Pus was set as $R_o=250$ m, the interference temperature limit was set as ITL=0.1 mW, the average speed of SU was set as $\bar{v}=5$, and the sensing triggering threshold was set as ξ=0.3, unless otherwise specified. It was assumed that one-time channel sensing time and switching time overheads are $T_s$=0.5 s and $T_{sw}$=1 s, respectively.

Figure 12:
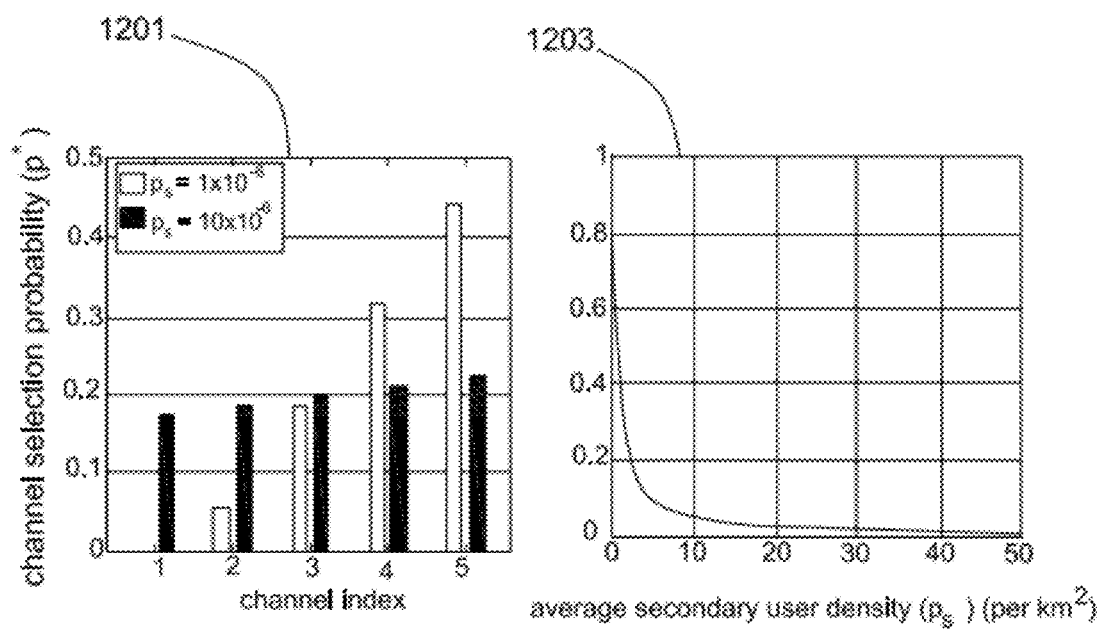
FIG. 12 is a collection of plots showing optimal channel selection probability within a model in an embodiment of the invention.

With respect to the impact of temporal channel availability, the inventors first studied the impact of PUs' temporal channel usage statistics on optimal channel selection strategy, as shown in channel index plot 1201 of FIG. 12. For this, it was assumed that the same PU density existed on each channel and that there exist different average channel idle probabilities, i.e., $\pi_{idle}$=[0.3, 0.4, 0.5, 0.6, 0.7]. As expected, channel index plot 1201 of FIG. 12 shows that the channel selection probability is higher for the channels with higher temporal availability, i.e., $p_i > p_j$ when $\pi_{idle,i} > \pi_{idle,j}$.

As can be seen, when SUs are densely populated, i.e., $\rho_s=10\times 10^{-6}/km^2$, the PUs' traffic statistics have less influence on the channel selection strategy. This can be clearly observed in secondary density plot 1203 of FIG. 12, wherein the difference in channel selection probability, max(p*)−min (p*), decreases with increasing secondary network density. A possible explanation of this is that, as the secondary density increases, SUs can only access the channel for a very small fraction of time because they have to share the channel with a large number of interfering neighbors. Thus, the achievable throughput of SUs become negligible regardless of the channel statistics (i.e., idle/busy), making them less important.

Figure 13:
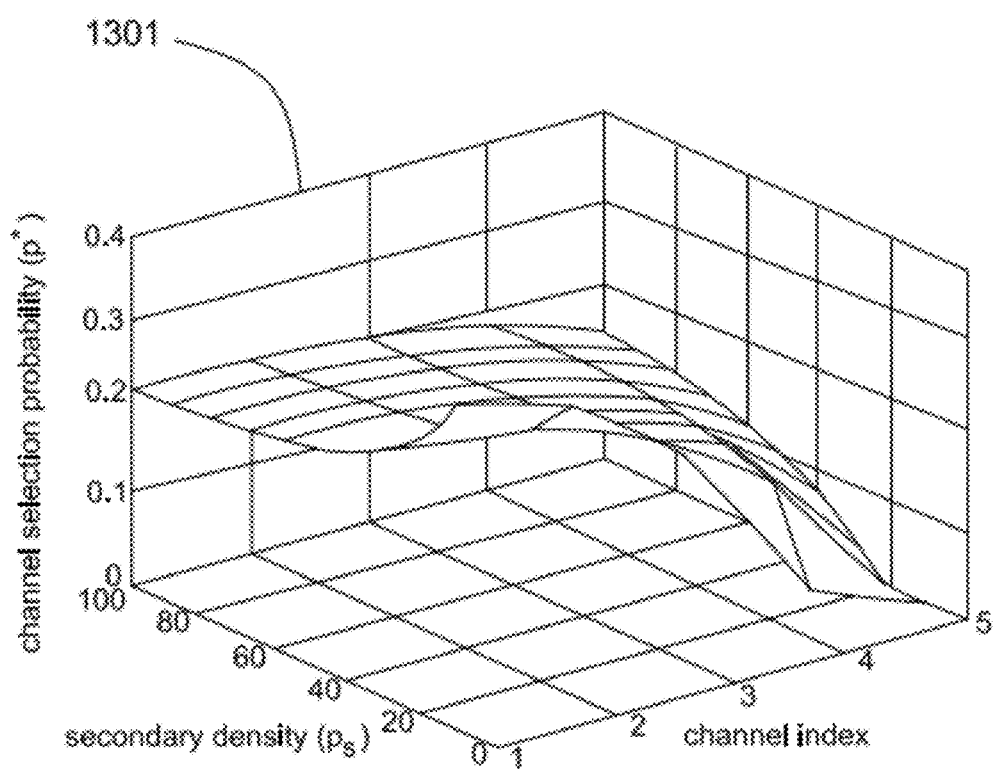
FIG. 13 is a 3-dimensional data plot showing the effect of primary density on p* in accordance with an embodiment of the invention.

The three-dimensional plot 1301 of FIG. 13 shows the impact of heterogeneous PU density on channel selection probability. In the simulation, the inventors set the PU traffic parameters to be the same for all the channels, i.e., $\lambda_{idle,i}=\lambda_{idle}$ and $\pi_{idle,i}=\pi_{idle}$ $\forall_i \in \kappa$. The plot 1301 shows that the channel selection probabilities differ depending on the PU density on each channel. The lower the PU density, the higher the channel selection probability. However, the PU density becomes less influential as the average secondary density increases, similar to the case in plot 1203 of FIG. 12.

Figure 14:
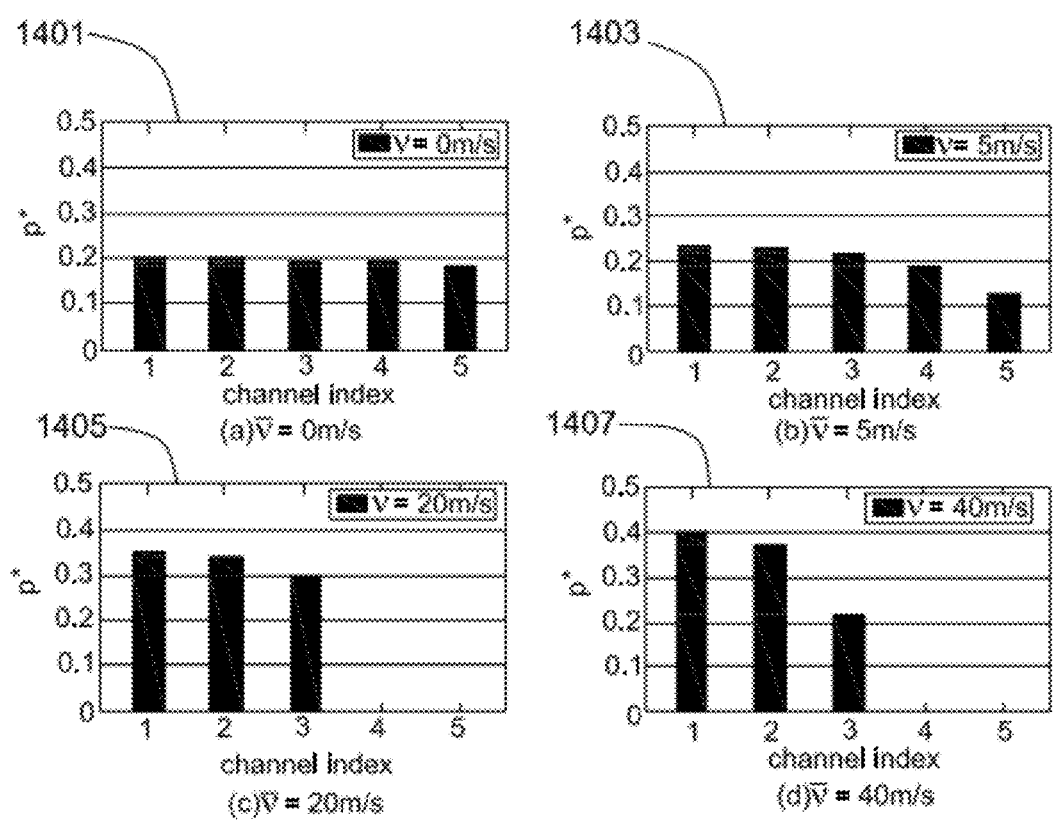
FIG. 14 is a collection of plots showing the effect of SU mobility on p* in accordance with an embodiment of the invention.

The channel index plots 1401-1407 of FIG. 14 show the impact of average speed of SUs on the optimal channel selection strategy. When SUs are stationary, i.e., $\bar{v}=0$ m/s (plot 1401), the channel selection probability is almost uniform across the channels even though the channels have different PU density. This is because, when SUs are stationary, spectrum sensing overhead is small for all the channels due to a large spectrum sensing interval. However, as SUs' speed increases, SUs prefer to choose a channel with low PU density because high speed of SUs require a significant increase of guard distance (ε) for primary protection (as can be seen in plot 1403 of FIG. 14), resulting in the PPRs on the channels with high PU density covering most of the network area.

To evaluate the efficacy of the proposed channel selection scheme, the inventors compared the performance of the following schemes: (i) random channel selection (RAND), (ii) optimal channel selection strategy only based on temporal channel availability model (OPT-T), and (iii) optimal channel selection strategy with the proposed spatio-temporal channel availability model (OPT-ST). In RAND, SUs randomly select a channel with equal probability. In OPT-T, SUs follow the optimal channel selection strategy, which is derived solely based on PUs' traffic statistics (i.e., $\lambda_{on}$ and $\lambda_{off}$), ignoring the spatial distribution (density) of PUs. In OPT-ST, SUs follow the channel selection strategy by fully exploiting the spatio-temporal channel usage characteristics of PUs.

To quantify the efficacy of the proposed algorithms, two primary performance metrics were employed: (i) normalized secondary network throughput, i.e., $$\frac{\Sigma_n R_n}{N},$$

and (ii) throughput fairness (Jain's fairness index), i.e., $$\frac{(\Sigma_n R_n)^2}{N \Sigma_n R_n^2},$$

where $R_n$ is the throughput of secondary link n, and N is the total number of secondary links in the network.

Figure 15:
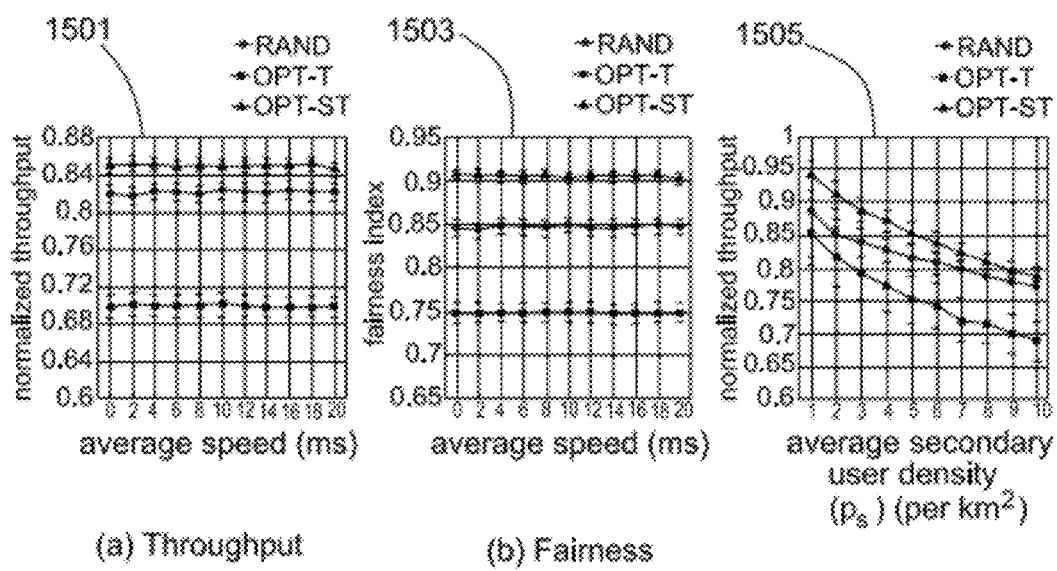
FIG. 15 is a collection of plots showing performance of a distributed channel selection algorithm in accordance with an embodiment of the invention.

The data plots 1501-1505 of FIG. 15 show the average and ±0.2σ interval of the achieved throughput and fairness of the testing schemes for various speeds of the SUs. In simulations, the inventors set the PU density on each channel to $\rho_v$[0.1, 0.2, 0.5, 1, 2]/km². The channel idle probabilities of the channels $\pi_{idle}$ were randomly selected in [0, 1] such that $\Sigma_\kappa \pi_{idle}=1$ for each topology, while the other channel statistics were assumed to be identical. For each testing scenarios, the inventors ran simulations over 1600 randomly-generated topologies to study the average behavior.

Plot 1501 of FIG. 15 shows that OPT-ST outperforms the other channel access strategies (i.e., OPT-T and RAND) under all simulated scenarios due to its ability to optimally select channels based on SUs mobility and the available spectrum opportunities in the spatio-temporal domains. Plot 1503 of FIG. 15 also shows that OPT-ST outperforms the other schemes in terms of fairness due to its ability to optimally select channels in such a way that the average lint throughput (or channel access time) is maximized.

Plot 1505 of FIG. 15 shows the throughput performance of the testing schemes for various secondary density values. The plot 1505 shows that the throughput performance degrades as the SU density increase because of the increased level of channel access contention among SUs. Moreover, the throughput performance improvement of OPT-ST over RAND decreases as the density increases. This is due to the fact that the optimal channel selection strategy will be independent of the channel availability (i.e., A's) in a dense network.

It will be appreciated that a method and system have been described for supporting the mobility of secondary users to exploit benefits of dynamic spectrum access. In particular, certain fundamental challenges in allowing mobility in CRNs have been addressed herein according to various embodiments of the invention.

However, it will also be appreciated that the described principles are more widely applicable than the illustrated examples. All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of spectrum access for wireless communications by a secondary unlicensed unit in a cognitive radio network (CRN) environment comprising one or more secondary unlicensed units and one or more primary licensed units, wherein the one or more secondary units are mobile units, the method comprising:
receiving information indicative of a location and movement of the one or more secondary unlicensed units and a channel usage pattern and spatial distribution of the one or more primary licensed units;
providing a guard distance to shield the one or more primary licensed units from interference induced by the one or more secondary unlicensed units, the guard distance specifying a radius of the one or more primary licensed units within which the one or more secondary unlicensed units will not have spectrum access, wherein the guard distance is optimized based on an average speed of the secondary unlicensed unit;
calculating channel availability to the one or more secondary unlicensed units according to a two-state Markov model including the guard distance as a constraint and based on the information indicative of the location and movement of the one or more secondary unlicensed units and the channel usage pattern and spatial distribution of the one or more primary licensed units; and
accessing the spectrum in the CRN environment from the one or more secondary unlicensed units based on the calculated channel availability.

2. The method of spectrum access for wireless communications according to claim 1, further comprising employing at the one or more secondary unlicensed units a selective spectrum sensing interval at which the one or more secondary unlicensed units analyze local spectrum to determine spectrum availability.

3. The method of spectrum access for wireless communications according to claim 1, wherein accessing the spectrum in the CRN environment from the one or more secondary unlicensed units based on the calculated channel availability further comprises competing for channel access among the one or more secondary unlicensed units.

4. The method of spectrum access for wireless communications according to claim 3, wherein competing for channel access among the one or more secondary unlicensed units comprises using a random access scheme to determine channel access.

5. The method of spectrum access for wireless communications according to claim 4, wherein the random access scheme to determine channel access comprises a carrier sense multiple access scheme.

6. The method of spectrum access for wireless communications according to claim 1, wherein each of the one or more secondary unlicensed units is selected from the group consisting of cellular telephones, smart phones, PDAs, handheld computers, laptop computers, wearable computers, and tablet computers.

7. The method of spectrum access for wireless communications according to claim 1, wherein each of the one or more secondary unlicensed units is adapted to communicate via a mobile ad-hoc secondary network within the CRN.

8. The method of spectrum access for wireless communications according to claim 1, wherein a number of licensed channels in the CRN is smaller than the number of secondary unlicensed units attempting to access the CRN.

9. A non-transitory computer-readable medium having thereon computer-executable instructions for providing spectrum access for wireless communications by a secondary unlicensed unit in a cognitive radio network (CRN) environment comprising one or more secondary unlicensed units and one or more primary licensed units, wherein the one or more secondary units are mobile units, the computer-executable instructions comprising:
instructions for receiving information indicative of a location and movement of the one or more secondary unlicensed units and a channel usage pattern and spatial distribution of the one or more primary licensed units;
instructions for providing a guard distance to shield the one or more primary licensed units from interference induced by the one or more secondary unlicensed units, the guard distance specifying a radius of the one or more primary licensed units within which the one or more secondary unlicensed units will not have spectrum access, wherein the guard distance is optimized based on an average speed of the secondary unlicensed unit;

instructions for calculating channel availability to the one or more secondary unlicensed units according to a two-state Markov model including the guard distance as a constraint and based on the information indicative of the location and movement of the one or more secondary unlicensed units and the channel usage pattern and spatial distribution of the one or more primary licensed units; and instructions for accessing the spectrum in the CRN environment from the one or more secondary unlicensed units based on the calculated channel availability.

10. The computer-readable medium according to claim 9, further comprising instructions for employing at the one or more secondary unlicensed units a selective spectrum sensing interval at which the one or more secondary unlicensed units analyze local spectrum to determine spectrum availability.

11. The computer-readable medium according to claim 9, wherein the instructions for accessing the spectrum in the CRN environment from the one or more secondary unlicensed units based on the calculated channel availability further comprise instructions for competing for channel access among the one or more secondary unlicensed units.

12. The computer-readable medium according to claim 11, wherein the instructions for competing for channel access among the one or more secondary unlicensed units comprise instructions far using a random access scheme to determine channel access.

13. The computer-readable medium according to claim 12, wherein the random access scheme to determine channel access comprises a carrier sense multiple access scheme.

14. The computer-readable medium according to claim 9, wherein each of the one or more secondary unlicensed units is selected from the group consisting of cellular telephones, smart phones, PDAs, handheld computers, laptop computers, wearable computers, and tablet computers.

15. The computer-readable medium according to claim 9, wherein each of the one or more secondary unlicensed units is adapted to communicate via a mobile ad-hoc secondary network within the CRN.

16. The computer-readable medium according to claim 9, wherein a number of licensed channels in the CRN is smaller than the number of secondary unlicensed units attempting to access the CRN.

17. A secondary unlicensed unit operable in a system for sharing spectrum access in a cognitive radio network (CRN) between one or more primary licensed units and the secondary unlicensed unit, wherein the secondary unlicensed unit is a mobile unit, the secondary unlicensed unit comprising:

a processor configured to execute computer-executable instructions; and a memory configured to store computer-executable instructions, including instructions for:

receiving information indicative of a location and movement of the secondary unlicensed unit and a channel usage pattern and spatial distribution of one or more primary licensed units, providing a guard distance specifying a radius of the one or more primary licensed units within which the secondary unlicensed unit will not have spectrum access, wherein the guard distance is optimized based on an average speed of the secondary unlicensed unit, calculating channel availability to the secondary unlicensed unit according to a two-state Markov model including the guard distance as a constraint and based on the information indicative of the location and movement of the secondary unlicensed unit and the channel usage pattern and spatial distribution of the one or more primary licensed units, and accessing the spectrum in the CRN environment from the secondary unlicensed unit based on the calculated channel availability.

18. The secondary unlicensed unit according to claim 17, wherein the instructions for accessing the spectrum in the CRN environment further comprise instructions for competing for channel access with another secondary unlicensed unit.

19. The secondary unlicensed unit according to claim 18, wherein the instructions for competing for channel access with another secondary unlicensed unit comprise instructions for using a random access scheme to determine channel access.

20. The secondary unlicensed unit according to claim 19, wherein the random access scheme comprises a carrier sense multiple access scheme.

* * * * *